N. W. CURTIS.
Horse Hay Rake.
No. 99,066. Patented Jan 25, 1870.
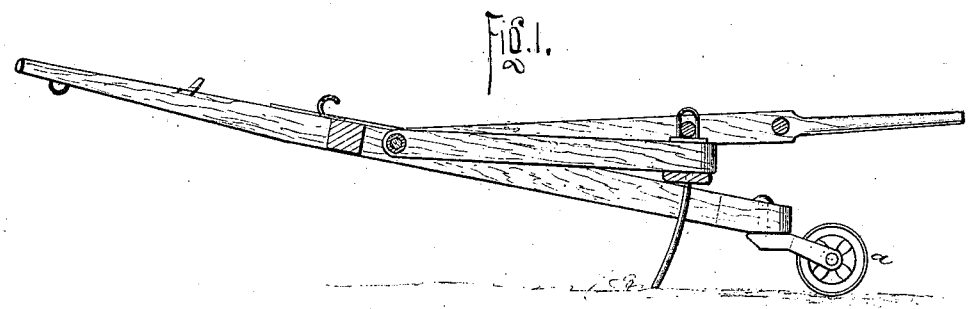
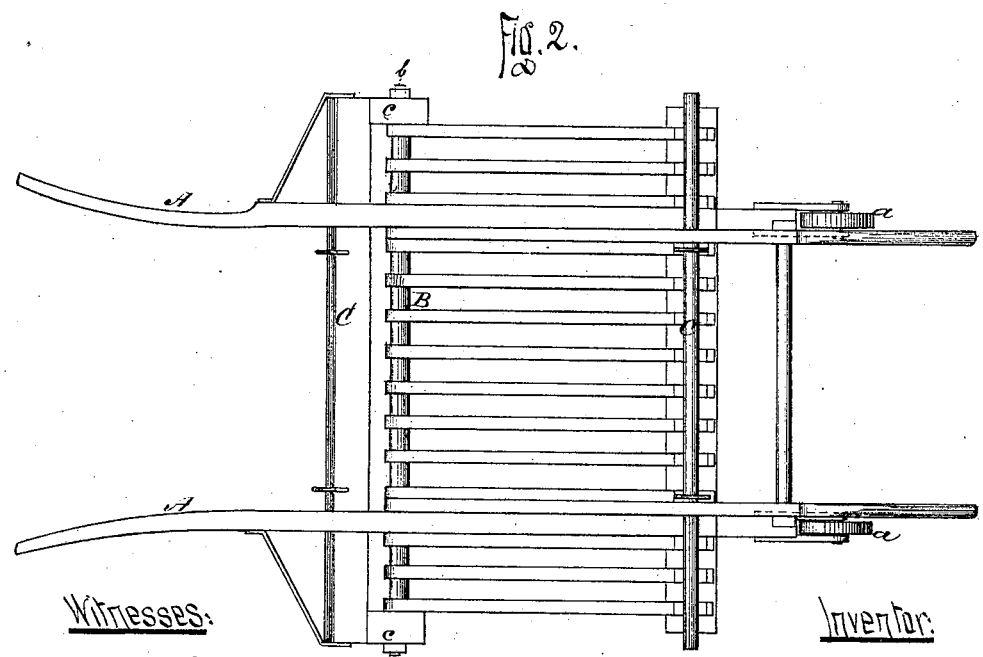
Witnesses: Inventor:

United States Patent Office.

N. W. CURTIS, OF JOHNSBURG, NEW YORK.

Letters Patent No. 99,066, dated January 25, 1870.

IMPROVED HORSE HAY-RAKE.

The Schedule referred to in these Letters Patent and making part of the same.

*To all whom it may concern:*

Be it known that I, N. W. CURTIS, of Johnsburg, in the county of Warren, and State of New York, have invented a new and improved Horse Hay-Rake; and I do hereby declare that the following is a full, clear, and exact description of the construction and operation of the same, reference being had to the accompanying drawings, making a part of this specification, in which—

Figure 1 is a side elevation, and
Figure 2, a plan view.

This invention relates to a rake, in which the supporting-wheels are on the rear ends of the thills, and the rake-head pivoted across the thills, about the centre thereof, between the supporting-wheels and the drawing-animal.

The invention consists in providing the rear ends of the thills with caster-wheels, which freely swivel on their upright pivots, and readily follow the motion of the rake, if it be swayed to one side or the other, to avoid trees or other obstacles, so as to render it an easy matter to steer the rake between and among all sorts of obstructions, and avoid them.

In the drawings—

A A are the thills, and B the rake-head, pivoted crosswise of the thills, in rear of the cross-bar C, in the arms $c\ c$ of which the ends of the shaft $b$, of the rake-head, are secured.

The thills A extend back of the rake, and have, on their rear ends, caster-wheels $a\ a$, which support the whole apparatus, and fluctuate from side to side with extreme readiness, following the movements given to the rake by the operator, when he wishes to steer clear of an obstacle, enabling the rake to be run as close to the obstruction as desired, without hitting it, and thus proving to be exceedingly convenient in rough, stumpy, or rocky land, or in orchards.

The caster-wheels afford equal facility in turning the rake. Being placed within the ends of the rake-head, they will follow without striking, wherever that can lead.

When going to and from the field, and wherever else it is not desirable that the rake should drag, it may be turned up toward the horse, resting on the cross-bar C.

Having thus described my invention,

What I claim as new, and desire to secure by Letters Patent, is—

The thills A, rake B, cross-bar C, caster-wheels $a$, and handles, all constructed and arranged substantially as and for the purpose described.

N. W. CURTIS.

Witnesses:
CHAS. A. PETTIT,
SOLON C. KEMON.